United States Patent [19]
Fukuma et al.

[11] Patent Number: 5,523,658
[45] Date of Patent: Jun. 4, 1996

[54] DEFLECTION YOKE DEVICE AND COLOR CATHODE RAY TUBE USING THE SAME

[75] Inventors: Kouji Fukuma; Nobutaka Okuyama; Soichi Sakurai, all of Yokohama; Hiroshi Yoshioka, Mobara; Yoshihiro Obara, Mizusawa; Takahisa Mizuta, Mobara, all of Japan

[73] Assignee: Hitachi, Ltd., Tokyo, Japan

[21] Appl. No.: 446,003

[22] Filed: May 19, 1995

[30] Foreign Application Priority Data

May 23, 1994 [JP] Japan .................................. 6-108121

[51] Int. Cl.$^6$ .................................................. H01J 29/51
[52] U.S. Cl. .................. 315/368.19; 315/368.28
[58] Field of Search ........................ 315/368.19, 368.28

[56] References Cited

U.S. PATENT DOCUMENTS

3,786,300  1/1974  Hill .
5,142,205  8/1992  Yabase et al. ..................... 315/368.26

*Primary Examiner*—Theodore M. Blum
*Attorney, Agent, or Firm*—Antonelli, Terry, Stout & Kraus

[57] ABSTRACT

A deflection yoke device comprises a convergence correction circuit connected between a vertical deflection coil and correction coils. The convergence correction circuit includes a first, second and third impedance elements connected in parallel and at least two diodes. The diodes are connected in series in the same direction and respond to a vertical deflection current of the vertical deflection coil to regulate a current flowing through the correction coils to thereby correct the YH mis-convergence.

13 Claims, 9 Drawing Sheets

DEFLECTION YOKE DEVICE AND COLOR CATHODE RAY TUBE USING THE SAME

BACKGROUND OF THE INVENTION

The present invention relates to a deflection yoke used with a color cathode ray tube for generating a plurality of in-line arranged electron beams and a color cathode ray tube using the same and, particularly, to a deflection yoke equipped with a convergence correction device and a color cathode ray tube using the same.

An example of a conventional deflection yoke having a convergence correction device is disclosed in, for example, Japanese Patent Application Laid-open No. H3-247093. In the deflection yoke disclosed, a set of diodes are connected in opposite directions to an upper portion correcting coil and a lower portion correcting coil, respectively, and a second impedance element is connected between junctions of the diodes and the respective correcting coils associated therewith. By connecting a first impedance element in parallel to the above mentioned circuit, both the non-linear coma aberration and the YH mis-convergence are corrected simultaneously.

In the disclosed conventional technique, however, the diodes are non-conductive during a period where an amount of vertical deflection is small and a current flowing through the first impedance element is small. Therefore, it is impossible to correct the YH mis-convergence while maintaining the linearity of the correction of coma aberration.

Further, in the disclosed technique, there is no measure taken to meet the problem of change of the amounts of correction of the coma aberration and the YH mis-convergence with change of temperature due to the temperature characteristics of forward voltage of the diodes.

In addition thereto, the disclosed prior art can not correct the mis-convergence in the shape of crossed vertical lines.

Further, in the disclosed prior art, it is impossible to regulate the mis-convergence of the vertical lines in an upper half and a lower half of a screen of the cathode ray tube, individually.

Japanese Patent Application Laid-open Nos. H3-82290 and H4-286841 disclose techniques similar to that disclosed in Japanese Patent Application Laid-open No. H3-247093.

An object of the present invention is to provide a deflection yoke with which it is possible to correct the YH mis-convergence while maintaining the linearity of correction of the coma aberration, to reduce a change of correction amount of the coma aberration and the YH mis-convergence with change of temperature and to correct the mis-convergence in the form of crossed vertical lines.

Another object of the present invention is to provide a deflection yoke with which the mis-convergence of the vertical lines can be regulated for the upper half and the lower half of the screen individually.

SUMMARY OF THE INVENTION

The above object can be achieved according to the present invention by providing a deflection yoke device for use in an in-line multi electron beam color cathode ray tube including a horizontal deflection coil, a vertical deflection coil and a core, comprising an upper correction coil for generating a pair of magnetic poles at upper two corner portions of a substantial symmetrical square plane about a horizontal and vertical axes perpendicular to a center axis of the color cathode ray tube, a lower correction coil for generating a pair of magnetic poles at lower two corner portions of the substantial symmetrical square plane, the lower correction coil having one end connected to one end of the upper correction coil, a first impedance element including at least one resistor, the first impedance element having one end connected to the other end of the upper correction coil, a second impedance element including at least one resistor, the second impedance element having one end connected to the other end of the lower correction coil and being connected in parallel to the first impedance element, the parallel connected first and second impedance elements being connected to one end of the vertical deflection coil, a diode circuit including at least a first pair of diodes connected in series with each other in the same direction and connected between the the other ends of the upper and lower correction coils and a third impedance element having one end connected to a junction of the first pair of diodes and the other end connected to the one end of the vertical deflection coil.

In the deflection yoke device, the diode circuit of the deflection yoke device further includes a second pair of diodes connected in series with each other in the same direction and having different forward voltage from that of the first pair of diodes, the second pair of diodes is connected in parallel to the first pair of diodes and the one end of the third impedance element is connected to a junction of the second pair of diodes.

In the deflection yoke device, the first and second impedance elements have negative temperature coefficients.

In the deflection yoke device, each of the first and second impedance elements includes at least one thermistor and a resistor.

The deflection yoke device further comprises a fourth impedance element including at least one thermistor. The fourth impedance has one end connected to the one end of the vertical deflection coil and the other end connected to the other ends of the first and second impedance elements.

In the deflection yoke device, a potentiometer is connected between the the other ends of said upper and lower correction coils and a fifth impedance element. The fifth impedance element has one end connected to the other ends of the first and second impedance elements and the other end connected to a slider of the potentiometer.

In the deflection yoke device, a sixth impedance element is included which has one end connected to the the other ends of the first and second impedance elements and the other end connected to the one ends of the upper and lower correction coils.

In another aspect of the present invention, a deflection yoke device for use in an in-line multi electron beam color cathode ray tube including a horizontal deflection coil, a vertical deflection coil and a core, comprises an upper correction coil for generating a pair of magnetic poles at upper two corner portions of a substantial symmetrical square plane about a horizontal and vertical axes perpendicular to a center axis of the color cathode ray tube, a lower correction coil for generating a pair of magnetic poles at lower two corner portions of the substantial symmetrical square plane, the lower correction coil having one end connected to one end of the upper correction coil, a first impedance element including at least one resistor, the first impedance element having one end connected to the other end of the upper correction coil, a second impedance element including at least one resistor, the second impedance element having one end connected to the other end of the lower correction coil and being connected in parallel to the first impedance element, the parallel connected first and second impedance elements being connected to one end of the vertical deflection coil, at least a pair of potentiometers connected between the the other ends of the upper and lower correction coils and a diode circuit including at least a pair of diodes having cathodes connected to a slider of one of the potentiometers and to the one end of the vertical deflection coil, respectively, and anodes connected to the one end of the vertical deflection coil and to a slider of the other potentiometer, respectively, wherein currents flowing through the upper and lower correction coils are changed by regulating the sliders of the potentiometer such that a magnetic field generated by the vertical and horizontal deflection coils and varied correspondingly to variations of the currents becomes a four-pole magnetic field regulable in a half of a vertical deflection period differently in the other half.

In the deflection yoke device, the diodes of the diode circuit have different on-voltages and the currents flowing through the upper and lower correction coils are regulated separately in the different halves of the vertical deflection period.

In the deflection yoke device, the deflection yoke device further comprises a third impedance element including a thermistor having negative temperature coefficient of resistance, the third impedance being connected between the other ends of the first and second impedances and the one end of said vertical deflection coil.

In the deflection yoke device, a fourth impedance element is included. The fourth impedance element includes a variable resistor and connected between the one ends of the upper and lower correction coils and the one end of the vertical deflection coil.

A color cathode ray tube for generating an in-line multi electron beams using the deflection yoke device is also provided.

DETAILED DESCRIPTION OF THE PREFERRED EMBODIMENTS

Preferred embodiments of the present invention will be described with reference to the accompanying drawings.

Figure 1:
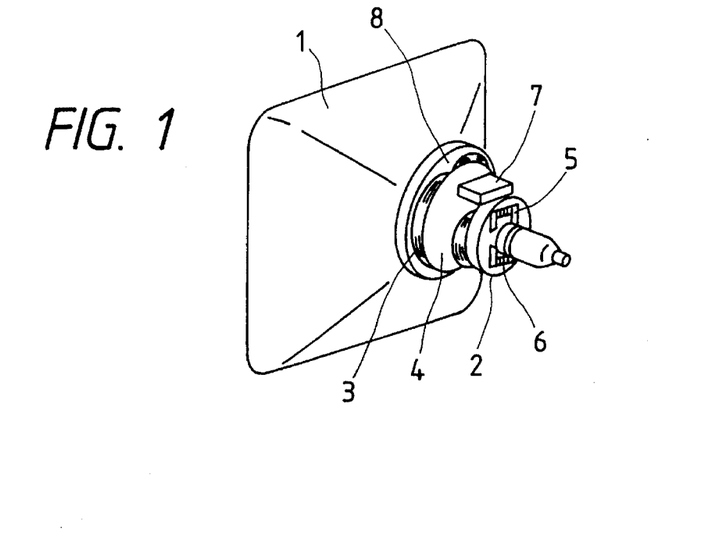
FIG. 1 is a perspective view of a main portion of a color cathode ray tube equipped with a deflection yoke according to a first embodiment of the present invention.

In FIG. 1 which is a perspective view of a main portion of a color cathode ray tube equipped with a deflection yoke according to a first embodiment of the present invention, the color cathode ray tube 1 includes a deflection yoke 2, a vertical deflection coil 3, a core 4, a magnetic member 5, a correction coil 6, a cover member 7 of a circuit board and a separator 8. The vertical deflection coil 3 on the deflection yoke 2 takes in the form of a saddle on an outer periphery of which the core 4 is provided. Further, a horizontal deflection coil which is not shown is provided on an inner surface of the separator 8. The magnetic member 5 equipped with the correction coil 6 is mounted on a rear portion of the vertical deflection coil 3.

Figure 2:
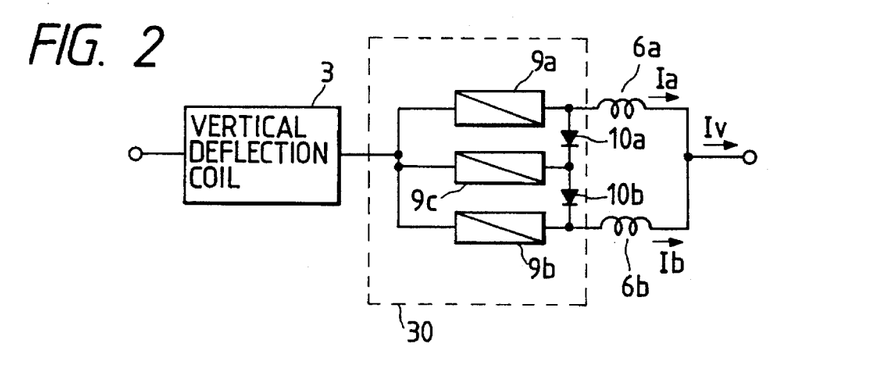
FIG. 2 is a circuit diagram of a convergence correction circuit of the deflection yoke of the first embodiment.

FIG. 2 is a circuit construction of a deflection yoke device according to the first embodiment of the present invention on the side of the vertical deflection coil 3, and FIG. 3 shows a construction of the correction coil 6 of the deflection yoke device according to the first embodiment of the present invention, together with a pattern of a correction magnetic field. In FIG. 3, the correction coil 6 is composed of an upper correction coil 6a and a lower correction coil 6b and the magnetic member 5 includes a generally U-shaped upper core member 5a and a generally inverted U-shaped lower core member 5b. Ends of the upper and lower core members 5a and 5b in an assembled state form diagonal four magnetic poles, a pair of upper diagonal poles and a pair of lower diagonal poles. The upper correction coil 6a is wound on the upper core member 5a and the lower correction coil 6b is wound on the lower core member 5b.

In FIG. 2, the circuit construction is composed of a correction circuit 30 and the upper and lower correction coils 6a and 6b. The correction circuit 30 includes a first to third impedance elements 9a to 9c and a pair of series-connected diodes 10a and 10b. One terminal of the upper correction coil 6a is connected in series with one terminal of the first impedance element 9a and one terminal of the lower correction coil 6b is connected in series with one terminal of the second impedance element 9b. The other terminals of the upper and lower correction coils 6a and 6b are connected to each other and the other terminals of the first and second impedance elements 9a and 9b are connected to each other, forming a parallel circuit, and to the vertical deflection coil 3. The one terminals of the first and second impedance elements 9a and 9b are connected through a circuit composed of the series-connected diodes 10a and 10b. A junction between the diodes 10a and 10b is connected to a junction of the other terminal of the first and second impedance elements 9a and 9b through a third impedance element 9c.

Figure 3A:
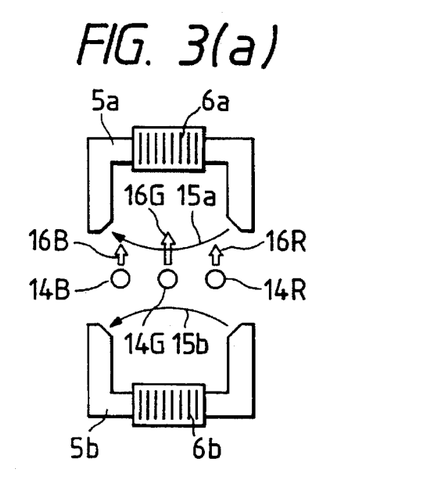
FIG. 3 illustrates a magnetic field generated by the correction coil of the deflection yoke of the first embodiment.
Figure 9A:
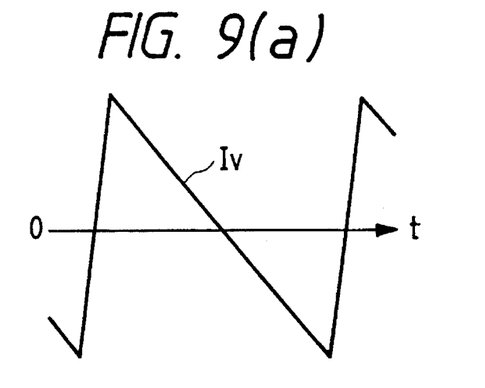
FIG. 9 shows waveforms of current flowing through the correction coils.

When a vertical deflection current Iv having a tooth waveform shown in FIG. 9(a) flows in this circuit construction, a sum of currents Ia and Ib flowing through the respective upper and lower correction coils 6a and 6b is equal to the current Iv. Therefore, an average current of the currents Ia and Ib is Iv/2 with which correction magnetic fields 15a and 15b shown in FIG. 3(a) are generated. These correction magnetic fields 15a and 15b form a pin-cushion shaped magnetic field with which a center electron beam 14G is subjected to a strong upward force 16G while electron beams 14B and 14R on both sides are subjected to weak upward forces 16B and 16R, respectively. Thus, the coma aberration VCR on an upper portion of a screen of the tube shown in FIG. 4(c) can be corrected. In a case where the direction of vertical deflection is downward, the current flowing directions, the directions of the correction magnetic fields and the directions of the above mentioned forces are inverted and thus the coma aberration on the lower portion of the screen can be corrected. Since an amount of correction of the coma aberration VCR is substantially proportional to the vertical deflection current Iv, it becomes substantially linear with respect to the amount of vertical deflection.

Now, an effect of a difference current (Ia-Ib) between the currents of the correction coils 6a and 6b due to the existence of the diodes 10a and 10b will be described.

Figure 3B:
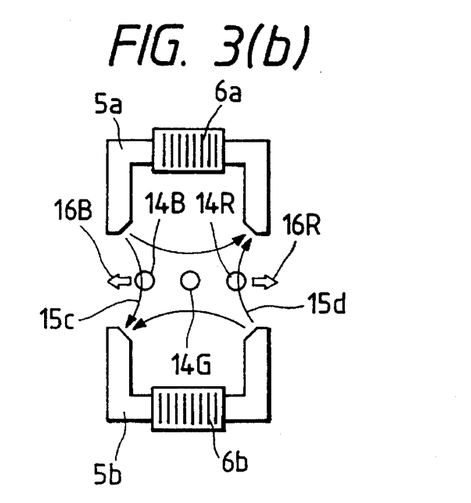
Figure 4A:
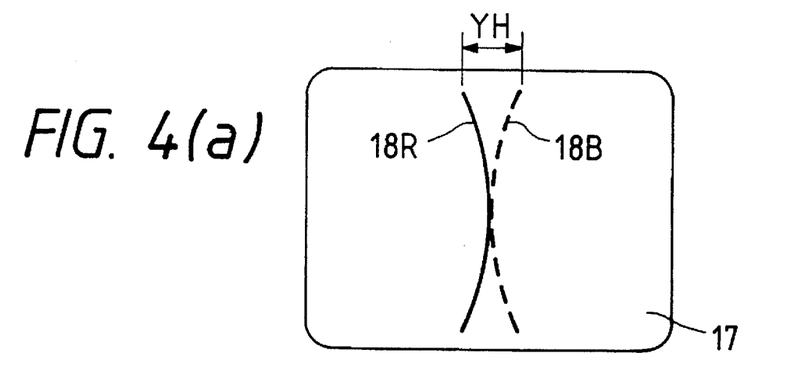
FIG. 4 illustrates a mis-convergence pattern.
Figure 9B:
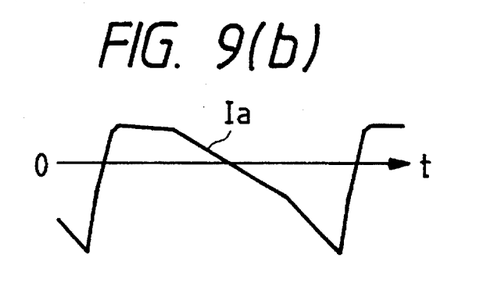
Figure 9C:
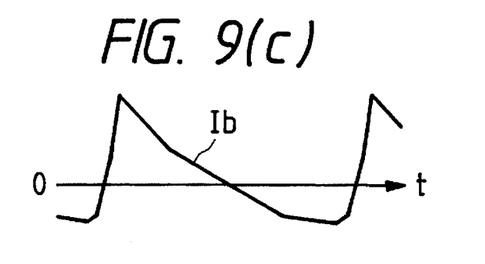
Figure 9D:
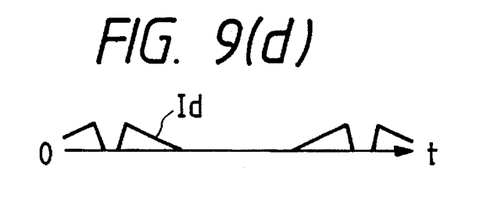

In FIG. 2, assuming that impedances of the impedance elements 9a and 9b are identical and impedances of the correction coils 6a and 6b are also identical, and assuming that the vertical deflection current Iv is small enough to make the diodes 10a and 10b non-conductive, the currents Ia and Ib flowing through the respective correction coils 6a and 6b are identical. On the other hand, when the direction of the vertical deflection current Iv shown in FIG. 2 is forward and the vertical deflection current Iv has a large negative value, the diode 10a becomes conductive, so that the current Ia becomes larger than the current Ib. Therefore, in that case, the waveforms of the currents Ia and Ib become as shown in FIGS. 9(b) and 9(c), respectively, and thus a waveform of a current component Id=(Ib−Ia)/2 becomes as shown in FIG. 9(d). The current component Id corresponds to a difference between the sum of Ia and Ib and the average current I/2 of them and generates correction magnetic fields 15c and 15d, resulting in a magnetic field pattern having four poles as shown in FIG. 3(b). With the correction magnetic fields 15c and 15d, forces 16B and 16R acting on the electron beams 14B and 14R on the both sides are generated. As a result, the YH mis-convergence in which vertical lines 18B and 18R to be described by the respective electron beams 14B and 14R are bent as shown in FIG. 4(a) can be corrected.

As mentioned, it is possible to correct the coma aberration by the current component Iv/2 which is the average of the correction currents Ia and Ib flowing through the correction coils 6a and 6b and simultaneously correct the YH mis-convergence by the current component Id.

Figure 5:
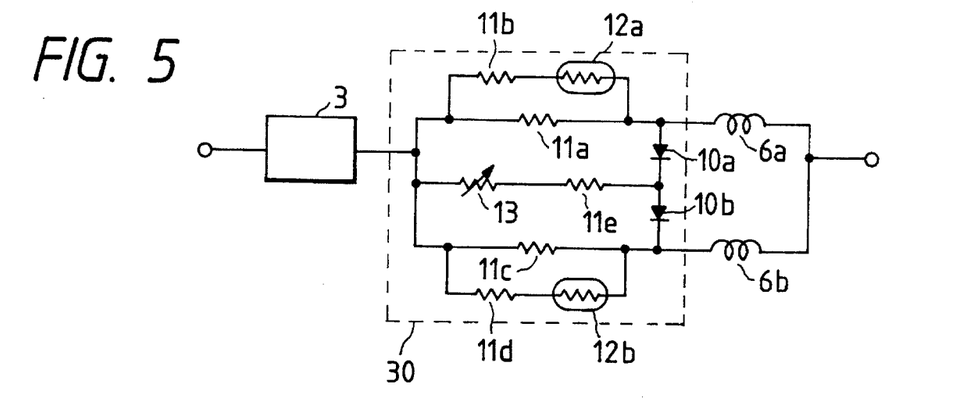
FIG. 5 is a circuit diagram of a first example of the convergence correction circuit to be used in the present invention.

FIG. 5 is a circuit diagram of a concrete example of the convergence correction circuit of the first embodiment of the present invention. In this example, the first impedance element 9a shown in FIG. 2 is constituted with a series circuit including a resistor 11b and a thermistor 12a and a resistor 11a connected in parallel to the series circuit. Further, the second impedance element 9b in FIG. 2 is is constituted with a series circuit including a resistor 11d and a thermistor 12b and a resistor 11c connected in parallel to the series circuit. The third impedance element 9c in FIG. 2 is constituted with a series circuit including a variable resistor 13 and a resistor 11e. Other circuit construction of the example in FIG. 5 are the same as those shown in FIG. 2.

In this example, a magnitude of the current component Id can be changed by regulating the variable resistor 13 and thus the correction amount of the YH mis-convergence can be regulated.

Further, with the use of the circuits including the thermistors 12a and 12b as the respective first and second impedance elements 9a and 9b, the resistance values of the impedance elements 9a and 9b have negative temperature coefficients with which, when the forward voltages of the diodes 10a and 10b are changed with temperature variation, voltages across the diodes 10a and 10b are changed substantially correspondingly to the voltage variation, so that it is possible to maintain currents flowing through the diodes 10a and 10b constant regardless of temperature variation. Therefore, it is possible to correct the YH mis-convergence.

Figure 6:
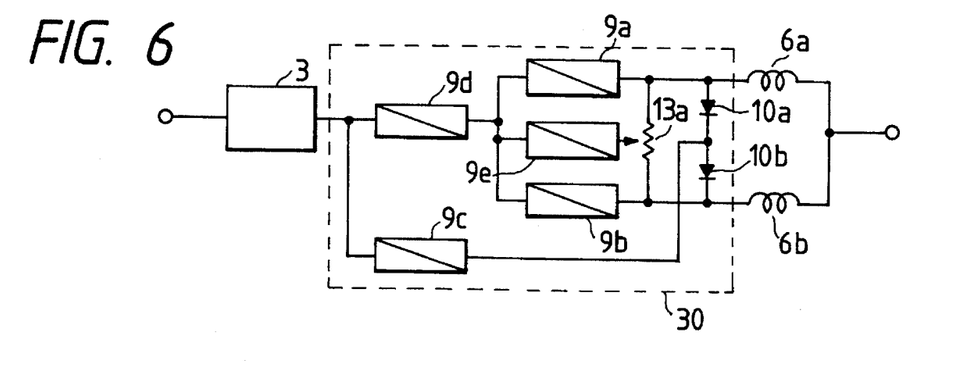
FIG. 6 is a circuit diagram of a convergence correction circuit of a deflection yoke according to a second embodiment of the present invention.

FIG. 6 shows a circuit construction of the deflection yoke according to a second embodiment. In FIG. 6, the same circuit elements as those shown in FIG. 2 are depicted by the same reference numerals, respectively. This embodiment is featured with respect to the embodiment shown in FIG. 5 by a fourth impedance element 9d connected between the other ends of the first and second impedance elements 9a and 9b and the one end of the vertical deflection coil 3. Further, a potentiometer 13a is connected between the other ends of the upper and lower correction coils 6a and 6b and a slider of the potentiometer 13a is connected to the other ends of the first and second impedance elements 9a and 9b through a fifth impedance element 9e.

The first, second and fourth impedance elements 9a, 9b and 9d function to divide a voltage across the diodes 10a and 10b. Therefore, voltages across the respective first and second impedance elements 9a and 9b are smaller than the voltage across the diodes 10a and 10b.

Figure 4B:
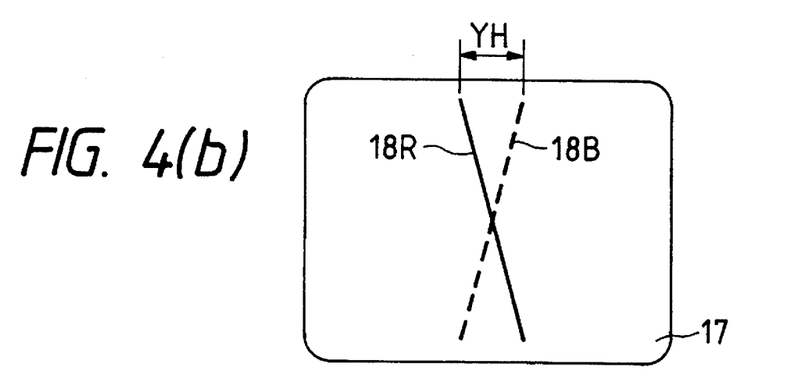
Figure 4C:
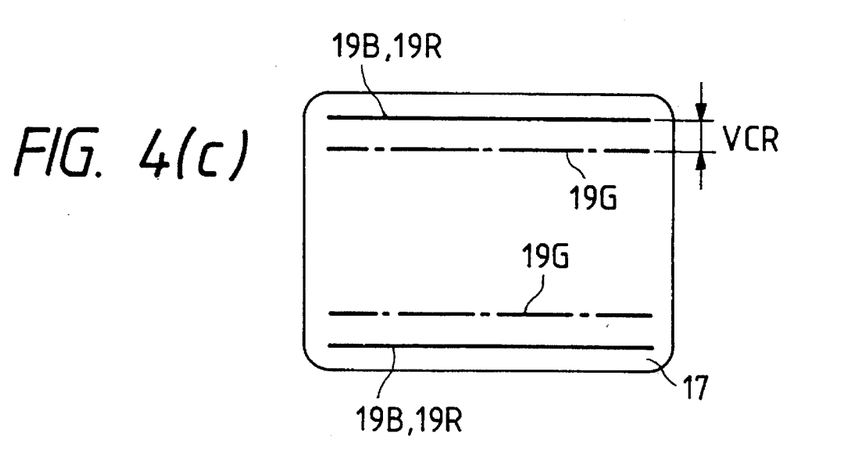

The potentiometer 13a and the fifth impedance element 9e function to generate current components Ia and Ib flowing through the respective correction coils 6a and 6b, one of which is always larger than the other regardless of flowing direction of the vertical deflection current Iv. For example, when the slider of the potentiometer 13a is moved to the other end of the lower correction coil 6b, the current Ib becomes larger than the current Ia. For an upward deflection of the electron beams, correction magnetic fields 15c and 15d shown in FIG. 3b are generated by the unbalanced currents of the upper and lower correction coils and thus the electron beams 14B and 14R in opposite sides are subjected to forces 16B and 16R in directions shown by thick arrows. On the other hand, for a downward deflection of the electron beams, the electron beams 14B and 14R are subjected to forces in the opposite directions by the current Ia and the current Ib which is smaller than Ia. Therefore, the mis-convergence such as shown in FIG. 4b in which vertical lines 18B and 18R drawn on the screen 17 by the electron beams 14B and 14R are crossed can be corrected. When the slider of the potentiometer 13a is moved to the other end of the upper correction coil 6a, the mis-convergence in the opposite direction can be corrected.

Figure 7:
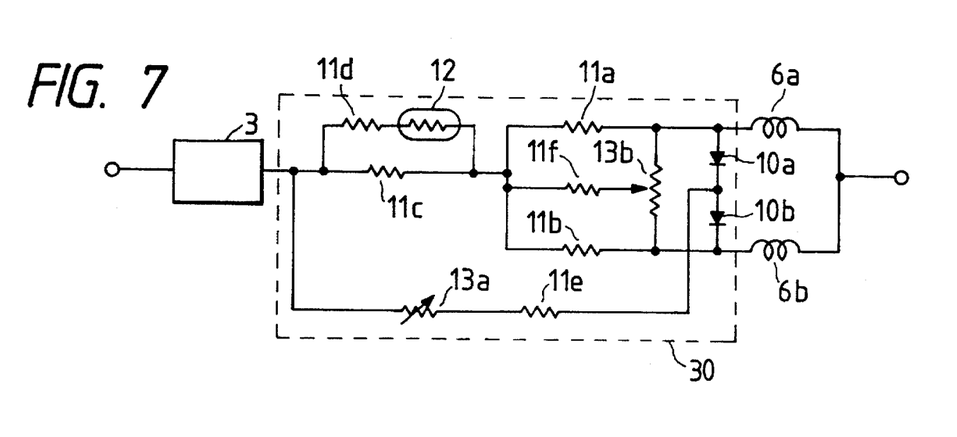
FIG. 7 is a circuit diagram of a second example of the convergence correction circuit to be used in the present invention.

FIG. 7 shows a concrete example of circuit diagram of the deflection yoke device of the present invention, in which the same circuit elements as those shown in FIG. 2 are depicted by the same reference numerals, respectively. In the circuit shown in FIG. 7, resistors 11a, 11b and 11f are used as the first, second and fifth impedance elements, respectively, and a series circuit of a potentiometer 13a and a resistor 11e is used as the third impedance element. Further, a parallel circuit of a resistor 11c and a series circuit of a resistor 11d and a thermistor 12 is used as the fourth impedance element.

In this circuit, it is possible to use a single thermistor 12 for correcting the temperature characteristics of the diodes 10a and 10b. That is, the circuit including the resistors 11c and 11d and the thermistor 12 can generate a voltage variation with temperature variation, which is necessary for correcting the temperature characteristics of the diodes.

On the other hand, currents flowing through the resistor 11f and the potentiometer 13b depend upon voltages across the respective resistors 11a and 11b and are not substantially influenced by a voltage across a circuit composed of the resistors 11c and 11d and the thermistor 12. Therefore, the amount of correction is hardly influenced by temperature change and so it is possible to correct the mis-convergence in the form of the crossing of the vertical lines 18B and 18R drawn on the screen 17 by the electron beams 14B and 14R.

Figure 8:
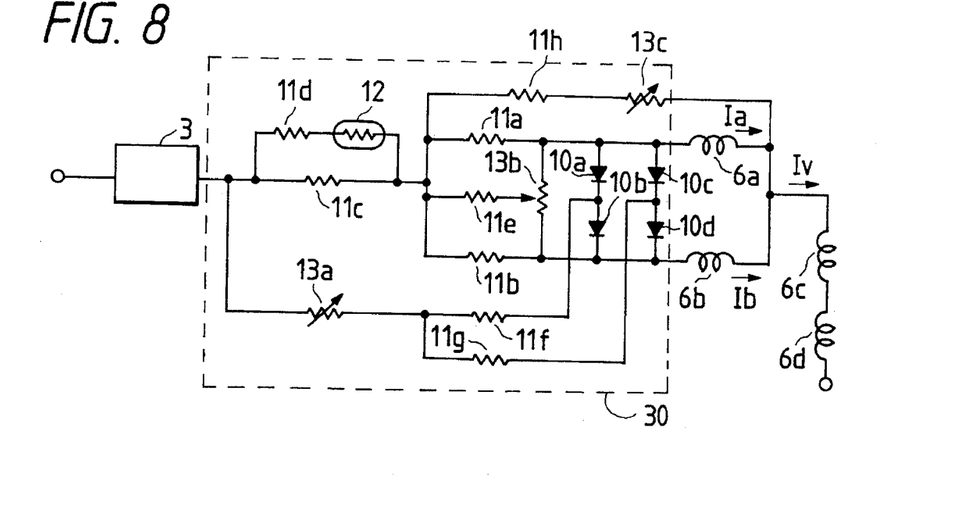
FIG. 8 is a circuit diagram of a third example of the convergence correction circuit to be used in the present invention.

FIG. 8 shows another concrete example of circuit diagram of the deflection yoke device of the present invention, in which the same circuit elements as those shown in FIG. 7 are depicted by the same reference numerals, respectively. In the circuit shown in FIG. 8, diodes 10c and 10d and a resistor 11g which are connected in the same manner as that of the circuit composed of the diodes 10a and 10b and the resistor 11f are used. In this case, however, the diodes 10c and 10d have higher forward voltages than those of the respective diodes 10a and 10b. An example of the diode having lower forward voltage may be a Schottky diode. In addition to the potentiometer 13a, it is possible to provide variable resistors in series with the respective resistors 11f and 11g.

Figure 9E:
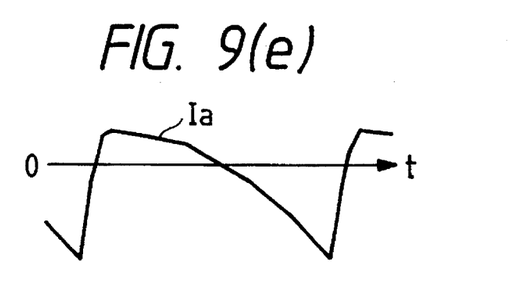
Figure 9F:
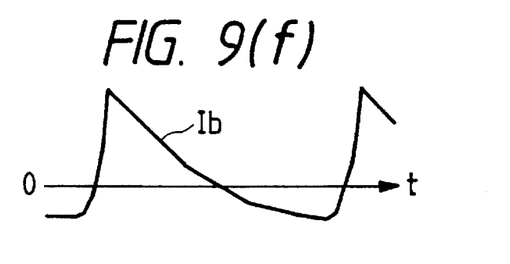
Figure 9G:
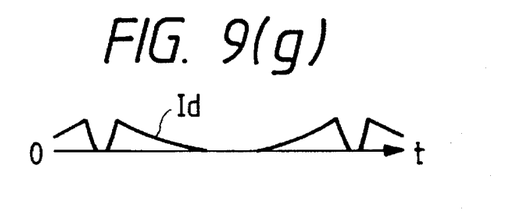

FIGS. 9e, 9f and 9g show waveforms of the currents Ia and Ib flowing through the correction coils 6a and 6b and the current component Id corresponding to (Ia-Ib)/2. When the vertical deflection current Iv is large, either of the diode 10a or 10b and either of the diode 10c or 10d are conductive, so that the current component Iv becomes large. On the other hand, when the vertical deflection current Iv is small, either of the diode 10a or 10b is conductive, so that the current component Iv becomes relatively small. Further, when the vertical deflection current Iv is very small, all of the diodes are non-conductive and the current component Id becomes 0. Therefore, the current component Id becomes substantially parabolic waveform and the four-pole magnetic field shown in FIG. 3b is generated thereby, with which it is possible to correct the YH mis-convergence in more finely.

In this concrete example, a series circuit of a resistor 11h and a variable resistor 13c is connected in parallel to the series circuit of the upper correction coil 6a and the resistor 11a as the first impedance. A portion of the vertical deflection current Iv flows through the resistor 11h and the variable resistor 13c and, therefore, an average value of the currents Ia and Ib flowing through the upper and lower correction coils 6a and 6b becomes smaller than Iv/2. Thus, the magnetic field intensity of the correction fields 15a and 15b shown in FIG. 3a which are generated by the effect of the average current of the currents Ia and Ib is reduced and hence the correction amount of coma aberration is reduced. Therefore, it is possible to regulate the correction amount of coma aberration by changing the value of the variable resistor 13c.

Further, in this example, a correction coil 6c which generates substantially analogous magnetic field to that generated by the upper correction coil 6a and a correction coil 6d which generates substantially analogous magnetic field to that generated by the lower correction coil 6b are connected in series with the vertical deflection coil 3.

Figure 10A:
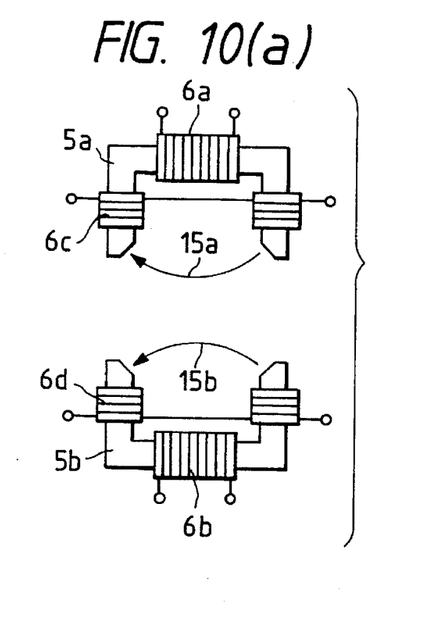
FIG. 10 shows examples of the construction of the convergence correction coils which can be used in the first to third embodiments.
Figure 10B:
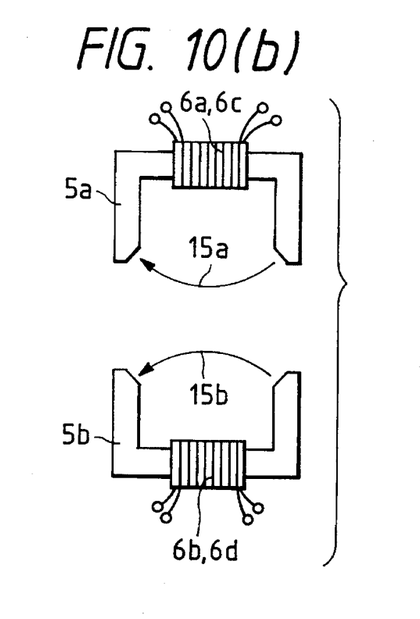

FIGS. 10a and 10b show physical examples of the correction coils 6a, 6b, 6c and 6d wound on the magnetic members 5a and 5b. In FIG. 10a, the correction coils 6a and 6b are wound on center portions of the magnetic members 5a and 5b, respectively, and the correction coils 6c and 6d are composed of pairs of series connected coils wound on leg portions of the respective magnetic members 5a and 5b. In FIG. 10b, the correction coils 6a and 6c are wound on the center portion of the magnetic member 5a and the correction coils 6b and 6d are wound on the center portion of the magnetic member 5b.

Since, with the correction coils 6c and 6d, a certain amount of coma aberration can be corrected, it is possible to reduce the number of turns of each of the correction coils 6a and 6b and to reduce inductance of these coils. Therefore, it is possible to restrict the abnormality of various corrections on an upper end portion of the screen due to inductance of the correction coils 6a and 6b.

Figure 10C:
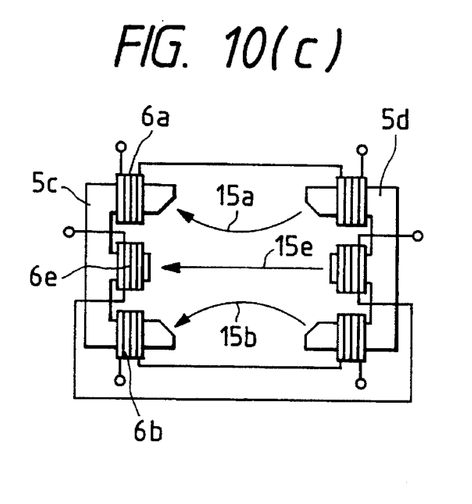
Figure 10D:
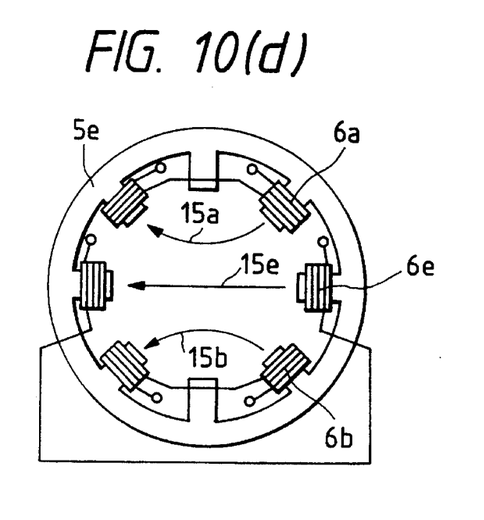

FIGS. 10c and 10d show other physical examples of correction coils 6a, 6b and 6e. In FIG. 10c, a pair of magnetic members 5c and 5d have generally E configuration and the correction coils 6a and 6b are composed of pairs of series connected coils wound on upper and lower leg portions of the respective magnetic members 5c and 5d. The correction coil 6e is composed of a pair of series connected coils wound of the middle legs of the magnetic members 5c and 5d. In FIG. 10d, a ring shaped magnetic member 5e having 8 equi-angularly disposed inward protrusions is provided. The correction coils 6a is composed of a pair of series connected coils wound on two of the inward protrusions with an intermediate protrusion therebetween being empty and The correction coils 6b is composed of a pair of series connected coils wound on two of the inward protrusions opposing to the two protrusions having the correction coil 6a. The correction coil 6e is composed of a pair of series connected coils wound on opposing two of the protrusions between the protrusions having the correction coils 6a and 6b. In FIGS. 10c and 10d, arrows show correction magnetic fields 15a, 15b and 15e to be generated by coils 6a, 6b and 6e, respectively.

These correction coils 6a and 6b are connected in the same manner as mentioned previously to correct the coma aberration and the YH mis-convergence. The correction coil 6e may be connected in series with the vertical deflection coil 3.

Figure 11:
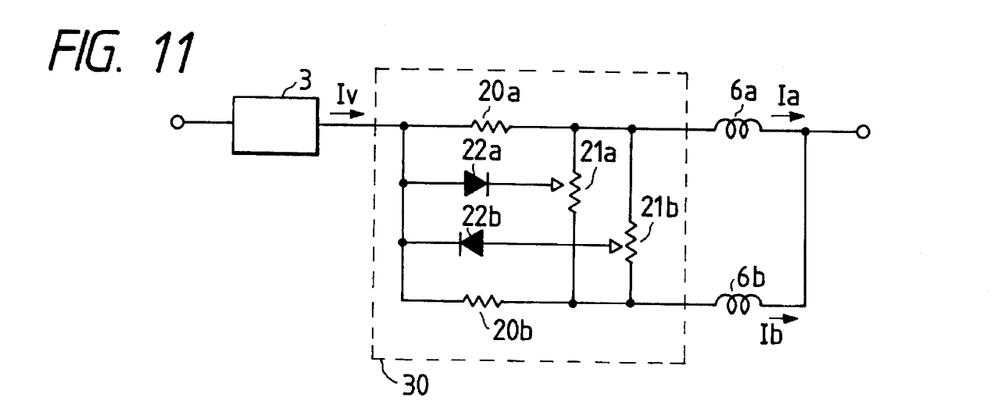
FIG. 11 shows a fourth example of the convergence correction circuit to be used in the present invention.
Figure 12:
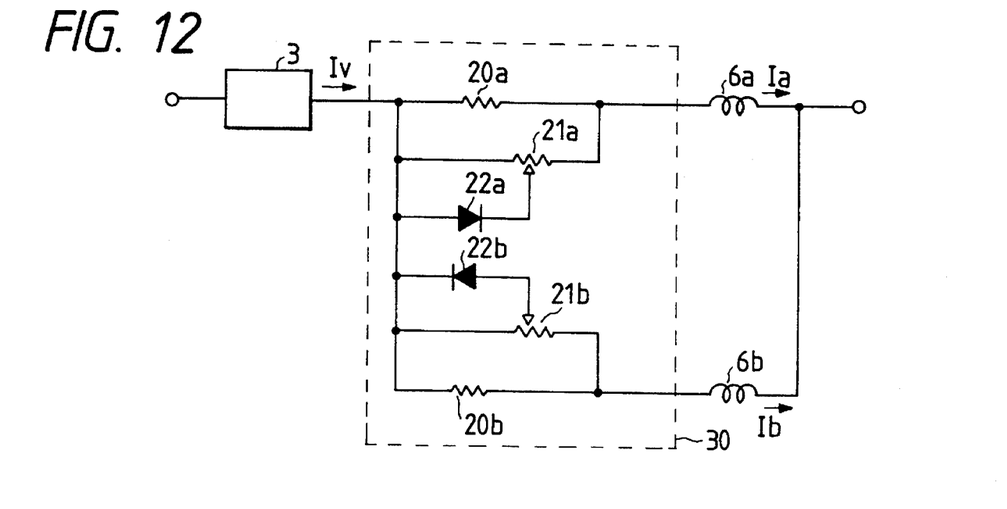
FIG. 12 shows a fifth example of the convergence correction circuit to be used in the present invention.

FIG. 11 shows another embodiment of the present invention, by which the mis-convergence of the vertical lines on an upper portion of the screen can be regulated independently from that on a lower portion of the screen. In FIG. 11, the first impedance element comprises a resistor 20a and the second impedance element comprises a resistor 20b. A parallel circuit of potentiometers 21a and 21b is connected between the other ends of the upper and lower correction coils 6a and 6b and a pair of diodes 22a and 22b are connected in reverse directions between the one end of the vertical deflection coil 3 and sliders of the potentiometers 21a and 21b, respectively. In operation with an assumption that the vertical deflection current Iv flows in the arrow direction in a preceding half of the vertical deflection period, the current Iv is branched by the resistors 20a and 20b and flows through the correction coils 6a and 6b as currents Ia and Ib. In this case, the diode 22a is turned on by voltages generated by the resistors 20a and 20b. Therefore, the ratio of the currents Ia and Ib in the half of the vertical deflection period can be regulated by regulating the potentiometer 21a. Thus, the variations 15a and 15b of the correction magnetic field shown in FIG. 3b can be generated, with which the deviation amount YH of the vertical lines 18R and 18B of the upper half of the screen 12 shown in FIG. 4a can be corrected. Similarly, in a subsequent half of the vertical deflection period, the current Iv flows in the opposite direction and the diode 22b is turned on. Therefore, the ratio of the currents Ia and Ib in the subsequent half of the vertical deflection period can be regulated by regulating the potentiometer 21b. Thus, the variations 15a and 15b of the correction magnetic field shown in FIG. 3b can be generated, with which the deviation amount YH of the vertical lines 18R and 18B of the lower half of the screen 12 shown in FIG. 4a can be corrected. FIG. 12 shows another example of the embodiment in which the potentiometers 21a and 21b in FIG. 11 are connected not in series but in parallel to the resistors 20a and 20b, respectively. An operation of this example is similar to that of the circuit shown in FIG. 11.

Figure 13:
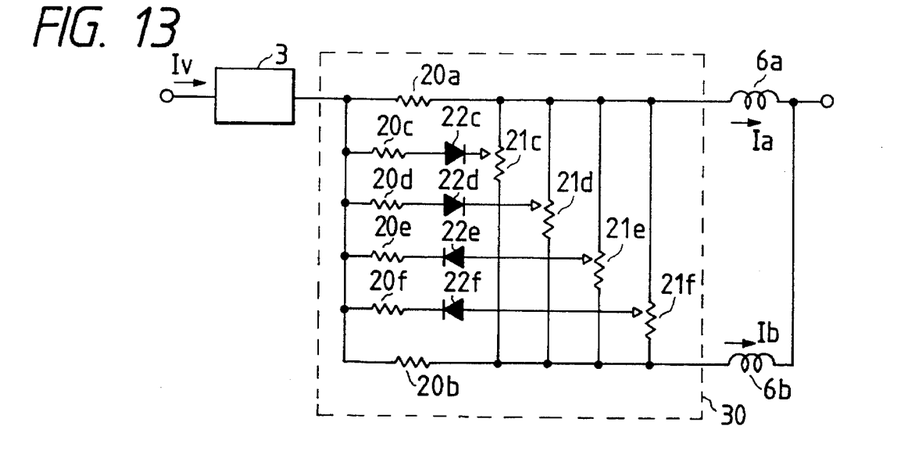
FIG. 13 shows a sixth example of the convergence correction circuit to be used in the present invention.

FIG. 13 shows another example of the embodiment, which is similar to that shown in FIG. 11 except that two pairs of potentiometers 21c, 21d, 21e and 21f and two pairs of diodes 22c, 22d, 22e and 22f connected in series to respective resistors 20c, 20d, 20e and 20f are used instead of the potentiometers 21a and 21b and the diodes 22a and 22b. In this case, it should be noted that the on-voltages of the diodes 22c and 22e are relatively low and those of the diodes 22d and 22f are relatively high. In operation, the diodes 22c and 22d are turned on during the first half of the vertical deflection period. Since the on-voltage of the diode 22c is low, it becomes conductive in a range corresponding to the upper half of the screen and, since on-voltage of the diode 22d is high, it becomes conductive in a range corresponding to the upper edge portion of the screen. Therefore, it is possible to correct the YH in the center portion of the screen by regulating the potentiometer 21c and correct the YH in the vicinity of the upper edge portion of the screen by regulating the potentiometer 21d. Similarly, the diodes 22e and 22f are turned on during the second half of the vertical deflection period. Since the on-voltage of the diode 22e is low, it becomes conductive in a range corresponding to the upper half of the screen and, since on-voltage of the diode 22f is high, it becomes conductive in a range corresponding to the lower edge portion of the screen. Therefore, it is possible to correct the YH in the center portion of the screen by regulating the potentiometer 21e and correct the YH in the vicinity of the lower edge portion of the screen by regulating the potentiometer 21f. By using two kinds of diodes having different on-voltages in combination, it is possible to correct the YH with high precision. In this case, the series resistors 20c, 20d, 20e and 20f function to limit currents flowing therethrough.

Figure 14:
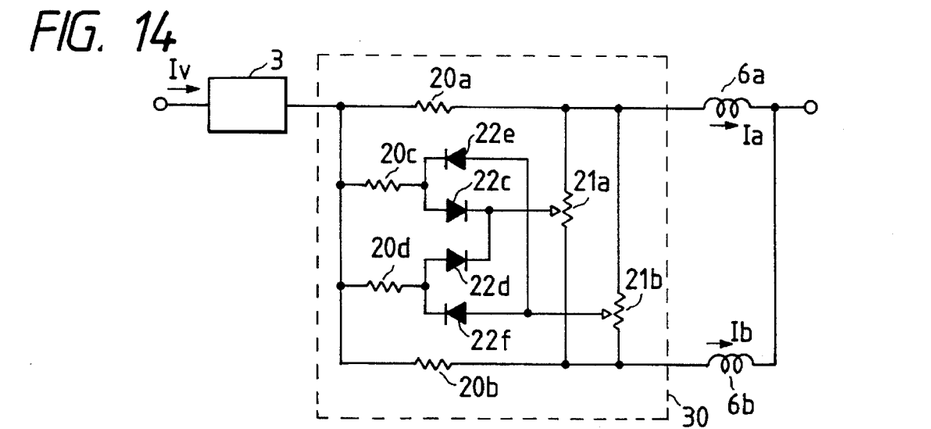
FIG. 14 shows a seventh example of the convergence correction circuit to be used in the present invention.

FIG. 14 shows another example of the embodiment which is featured by that the potentiometers 21c and 21d in FIG. 13 are replaced by a single potentiometer 21a and the potentiometers 21e and 21f are replaced by a single potentiometer 21b and that the resistors 20c and 20e connected in series to the respective diodes 22c and 22e having low on-voltages are replaced by a single resistor 20c and the resistors 20d and 20f connected in series to the respective diodes 22d and 22f having high on-voltages are replaced by a single resistor 20d. An operation of this example which requires a smaller number of circuit elements compared with the circuit shown in FIG. 13 is similar to that of the circuit shown in FIG. 13.

Figure 15:
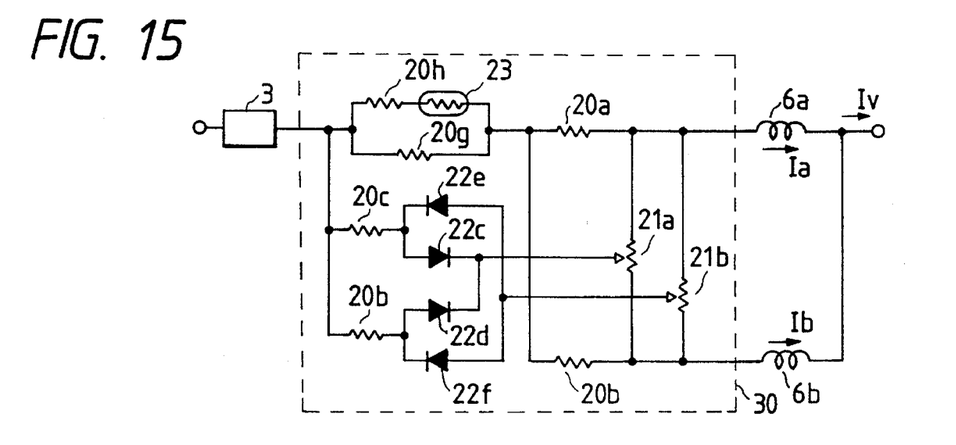
FIG. 15 shows an eighth example of the convergence correction circuit to be used in the present invention.

FIG. 15 shows another example of the embodiment which is a modification of the circuit shown in FIG. 14 by including a parallel circuit of a resistor 20g and a series circuit of a resistor 20h and a thermistor 23 having a negative temperature coefficient for concomitant with a temperature drift of the circuit. The parallel circuit is connected between the one end of the vertical deflection circuit 3 and the other end of the resistor 20a in FIG. 14 and the resistors 20c and 20d in FIG. 14 are connected to the one end of the circuit 3. It is general that, when temperature increases, the on-voltages of the diodes 22c, 22d, 22e and 22f become low with which the problem of variation of the YH correction amount occurs. In this example, this problem is solved by the parallel circuit of the resistor 20g for generating the on-voltage and the series circuit of the thermistor 23 and the resistor 20h. That is, when ambient temperature increases, the resistance value of the thermistor 23 becomes smaller and a combined resistance of the parallel circuit including the thermistor 23 and the resistors 20h and 20g becomes smaller, resulting in a reduction of on-voltage of diode. Therefore, the problem of temperature drift is solved. It should be noted that the thermistor 23 may be connected in series with each of the resistors 20a and 20b in FIGS. 11 to 14.

Figure 16:
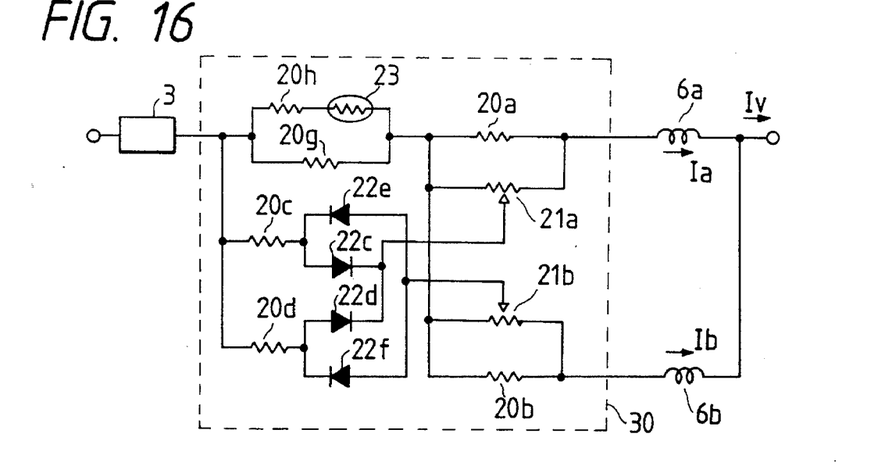
FIG. 16 shows a ninth example of the convergence correction circuit to be used in the present invention.

FIG. 16 shows another example of the embodiment, which is a combination of the circuits shown in FIGS. 12 and 15. The effect of this example is a combination of those of the circuits shown in FIGS. 12 and 15.

Figure 17:
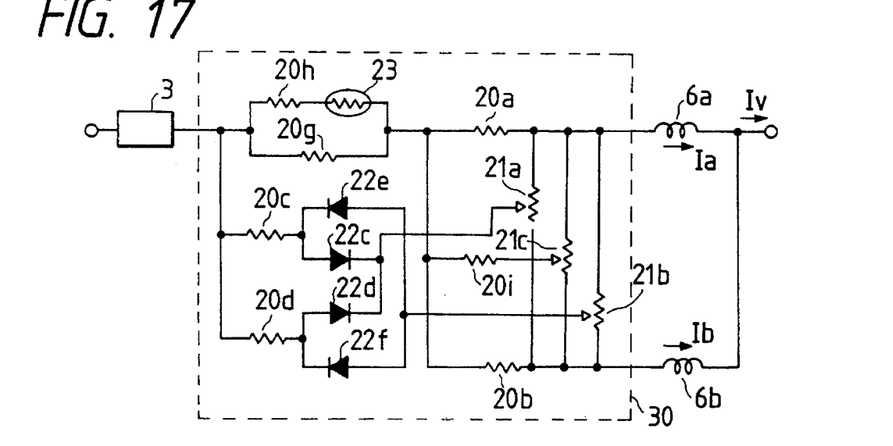
FIG. 17 shows a tenth example of the convergence correction circuit to be used in the present invention.

FIG. 17 shows another example of the embodiment, which is a modification of the circuit shown in FIG. 15 and featured by further including a resistor 20i and a potentiometer 21c. Since there is no diode connected to a slider of the potentiometer 21c, it is possible to simultaneously regulate the preceding half and the succeeding half of the vertical deflection period to thereby correct the crossing YH shown in FIG. 3b. By adding the resistor 20i and the potentiometer 21c to each of the circuits shown in FIGS. 12 to 15, it is possible to correct the crossing YH shown in FIG. 3b, as well.

Figure 18:
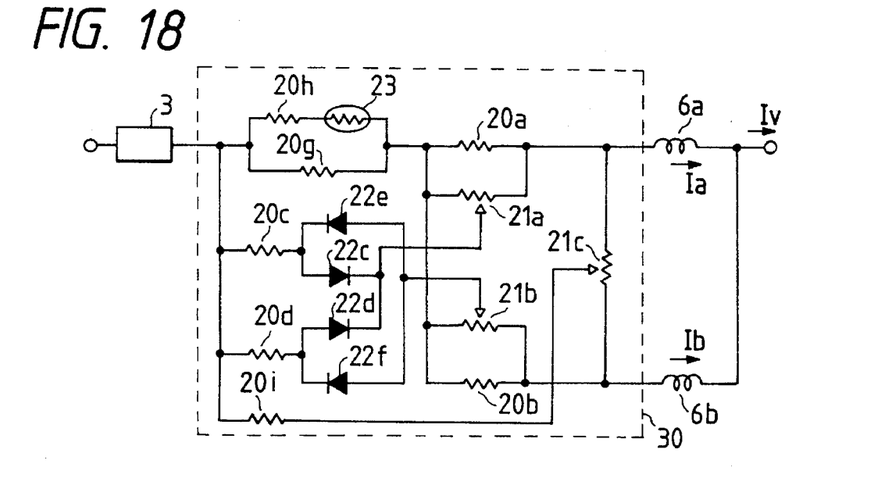
FIG. 18 shows an eleventh example of the convergence correction circuit to be used in the present invention.

FIG. 18 shows another example of the embodiment, which is a combination of the circuits shown in FIGS. 16 and 17 and featured by connecting the resistor 20i between the one end of the vertical deflection circuit 3 and the slider of the potentiometer 21c. With this circuit, it is possible to correct the crossing YH shown in FIG. 3b, as well.

Figure 19:
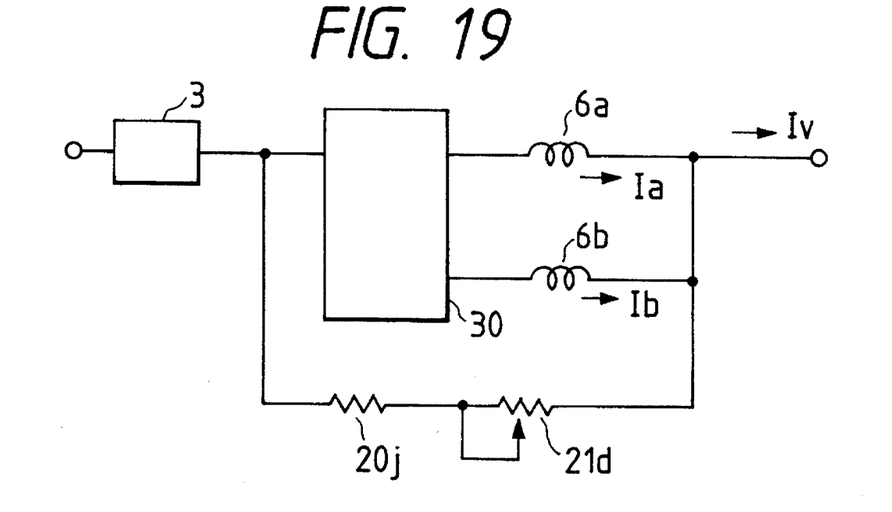
FIG. 19 is a circuit diagram of a convergence correction circuit of the deflection yoke according to a third embodiment of the present invention.

FIG. 19 shows another example of the embodiment. In FIG. 19, a series circuit of a resistor 20j and a variable resistor 21d is connected between the one end of the vertical deflection circuit 3 and the one ends of the upper and lower correction coils 6a and 6b. In this example, a portion of the vertical deflection current Iv flows through the series circuit. Since the current can be regulated by regulating the variable resistor 21d, it is possible to change the currents flowing through the correction coils 6a and 6b and hence the intensity of the magnetic fields 15a and 15b in FIG. 3a. Therefore, it is possible to regulate VCR shown in FIG. 4c which is a difference between lateral lines 19B and 19R. The resistor 20j may be connected between the one ends of the correction coils and a certain point in the correction circuit 30.

Figure 20:
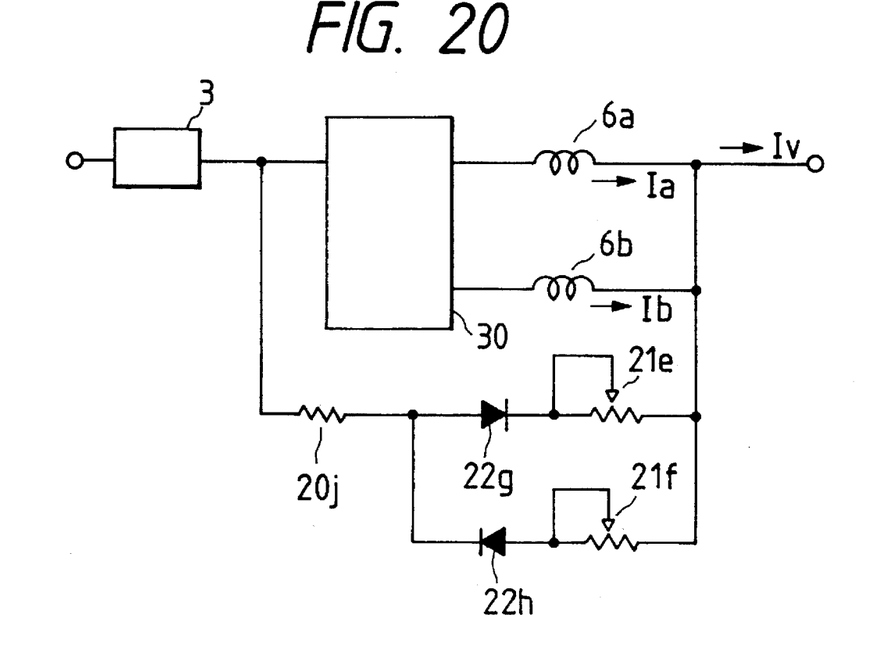
FIG. 20 is a circuit diagram of a convergence correction circuit of the deflection yoke according to a fourth embodiment of the present invention.

FIG. 20 is a modification of the circuit shown in FIG. 19. In this modification, the parallel circuit including the resistor 20j and the variable resistor 21d in FIG. 19 is substituted by a circuit including a first series circuit of a diode 22g of one direction and a variable resistor 21e, a second series circuit of a diode 22h of the other direction and a variable resistor 21f which is connected in parallel to the first series circuit and a resistor 20j connected in parallel to the parallel circuit of the first and second series circuit. In operation, the diode 22g is turned on during the preceding half of the vertical deflection period and the diode 22h is turned on during the succeeding half of the vertical deflection period. Therefore, it is possible to regulate the variable resistors 21e and 21f independently in the preceding and succeeding halves of the vertical deflection period, so that the upper and lower VCRs shown in FIG. 4c can be regulated independently.

As described hereinbefore, according to the present invention, it is possible to correct the YH mis-convergence while maintaining the linearity of correction of coma aberration, reduce a variation of correction amount of these corrections with temperature variation and correct the mis-convergence in the form of crossed vertical lines. Further, according to the present invention, the mis-convergence of the vertical lines in the upper and lower portions of the screen can be regulated independently, so that it is possible to reduce the residual mis-convergence while regulation time being reduced. Further, by the use of the thermistor, the temperature drift can be removed.

What is claimed is:

1. A deflection yoke device for use in an in-line multi electron beam color cathode ray tube including a horizontal deflection coil, a vertical deflection coil and a core, comprising:

an upper correction coil for generating a pair of magnetic poles at upper two corner portions of a substantial symmetrical square plane about a horizontal and vertical axes perpendicular to a center axis of the color cathode ray tube;

a lower correction coil for generating a pair of magnetic poles at lower two corner portions of the substantial symmetrical square plane, said lower correction coil having one end connected to one end of said upper correction coil;

a first impedance element including at least one resistor, said first impedance element having one end connected to the other end of said upper correction coil;

a second impedance element including at least one resistor, said second impedance element having one end connected to the other end of said lower correction coil and being connected in parallel to said first impedance element, said parallel connected first and second impedance elements being connected to one end of the vertical deflection coil;

a diode circuit including at least a first pair of diodes connected in series with each other in the same direction and connected between said the other ends of said upper and lower correction coils; and a third impedance element having one end connected to a junction of said first pair of diodes and the other end connected to said one end of said vertical deflection coil.

2. The deflection yoke device claimed in claim 1, wherein said diode circuit further includes a second pair of diodes connected in series with each other in the same direction and having different forward voltage from that of said first pair of diodes, said second pair of diodes is connected in parallel to said first pair of diodes and said one end of said third impedance element is connected to a junction of said second pair of diodes.

3. The deflection yoke device claimed in claim 1 or 2, wherein said first and second impedance elements have negative temperature coefficients.

4. The deflection yoke device claimed in claim 3, wherein each of said first and second impedance elements includes at least one thermistor and a resistor.

5. The deflection yoke device claimed in claim 3, further comprising a fourth impedance element including at least one thermistor, said fourth impedance having one end connected to said one end of said vertical deflection coil and the other end connected to the other ends of said first and second impedance elements.

6. The deflection yoke device claimed in any of claims 1 to 5, further comprising a potentiometer connected between said the other ends of said upper and lower correction coils and a fifth impedance element, said fifth impedance element having one end connected to said the other ends of said first and second impedance elements and the other end connected to a slider of said potentiometer.

7. The deflection yoke device claimed in any of claims 1 to 5, further comprising a sixth impedance element having one end connected to said the other ends of said first and second impedance elements and the other end connected to said one ends of said upper and lower correction coils.

8. A color cathode ray tube for generating an in-line multi electron beams, comprising the deflection yoke device claimed in any of claims 1 to 7.

9. A deflection yoke device for use in an in-line multi electron beam color cathode ray tube including a horizontal deflection coil, a vertical deflection coil and a core, comprising:

an upper correction coil for generating a pair of magnetic poles It upper two corner portions of a substantial symmetrical square plane about a horizontal and vertical axes perpendicular to a center axis of the color cathode ray tube;

a lower correction coil for generating a pair of magnetic poles at lower two corner portions of the substantial symmetrical square plane, said lower correction coil having one end connected to one end of said upper correction coil;

a first impedance element including at least one resistor, said first impedance element having one end connected to the other end of said upper correction coil;

a second impedance element including at least one resistor, said second impedance element having one end connected to the other end of said lower correction coil and being connected in parallel to said first impedance element, said parallel connected first and second impedance elements being connected to one end of the vertical deflection coil;

at least a pair of potentiometers connected between said the other ends of said upper and lower correction coils; and a diode circuit including at least a pair of diodes having cathodes connected to a slider of one of said potentiometers and to said one end of said vertical deflection coil, respectively, and anodes connected to said one end of said vertical deflection coil and to a slider of the other potentiometer, respectively, wherein currents flowing through said upper and lower correction coils are changed by regulating said sliders of said potentiometer such that a magnetic field generated by the vertical and horizontal deflection coils and varied correspondingly to variations of the currents becomes a four-pole magnetic field regulable in a half of a vertical deflection period differently in the other half.

10. The deflection yoke device claimed in claim 9, wherein said diodes of said diode circuit have different on-voltages and the currents flowing through said upper and lower correction coils are regulated separately in the different halves of the vertical deflection period.

11. The deflection yoke device claimed in claim 9, further comprising a third impedance element including a thermistor having negative temperature coefficient of resistance, said third impedance being connected between said the other ends of said first and second impedances and said one end of said vertical deflection coil.

12. The deflection yoke device claimed in claim 9, further comprising a fourth impedance element including a variable resistor and connected between said one ends of said upper and lower correction coils and said one end of said vertical deflection coil.

13. A color cathode ray tube for generating an in-line multi electron beams, comprising the deflection yoke device claimed in any of claims 9 to 12.

\* \* \* \* \*